United States Patent
Wada et al.

(10) Patent No.: US 11,196,227 B2
(45) Date of Patent: Dec. 7, 2021

(54) OPTICAL AMPLIFIER

(71) Applicant: NIPPON TELEGRAPH AND TELEPHONE CORPORATION, Tokyo (JP)

(72) Inventors: Masaki Wada, Tsukuba (JP); Shinichi Aozasa, Atsugi (JP); Taiji Sakamoto, Tsukuba (JP); Takashi Yamamoto, Tsukuba (JP); Kazuhide Nakajima, Tsukuba (JP); Takayoshi Mori, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 356 days.

(21) Appl. No.: 16/343,357

(22) PCT Filed: Oct. 25, 2017

(86) PCT No.: PCT/JP2017/038506
§ 371 (c)(1),
(2) Date: Apr. 18, 2019

(87) PCT Pub. No.: WO2018/084048
PCT Pub. Date: May 11, 2018

(65) Prior Publication Data
US 2019/0245317 A1    Aug. 8, 2019

(30) Foreign Application Priority Data
Nov. 1, 2016 (JP) .............................. JP2016-214532

(51) Int. Cl.
*H01S 3/00* (2006.01)
*H01S 3/067* (2006.01)
(Continued)

(52) U.S. Cl.
CPC .......... *H01S 3/06791* (2013.01); *H01S 3/067* (2013.01); *H01S 3/0675* (2013.01);
(Continued)

(58) Field of Classification Search
CPC ............... H01S 3/06791; H01S 3/0675; H01S 3/06754; H01S 3/106; H04B 10/2581
See application file for complete search history.

(56) References Cited

U.S. PATENT DOCUMENTS 6,008,932 A * 12/1999 Luo ....................... H01S 3/1302
359/337
6,091,541 A    7/2000 Yoon
(Continued)

FOREIGN PATENT DOCUMENTS

| CA | 2360925 A1 | 8/2000 |
| CN | 1213201 A | 4/1999 |

(Continued)

OTHER PUBLICATIONS

Y.Yung et al. "First demonstration of multimode amplifier for spatial division multiplexed transmission systems" ECOC2011 paper Th.13. K.4.
(Continued)

*Primary Examiner* — Mark Hellner
(74) *Attorney, Agent, or Firm* — Harness, Dickey & Pierce, P.L.C.

(57) ABSTRACT

An optical amplifier of the present disclosure includes an optical resonator that includes an amplification fiber capable of amplifying signal light having one or more propagation modes and resonates at least one propagation mode of the signal light amplified by the amplification fiber; an excitation light source that outputs excitation light for exciting the amplification fiber; and a multiplexer that multiplexes the signal light and the excitation light, in which the optical
(Continued)

resonator includes a gain clamp setting unit which sets gain clamp for at least one propagation mode out of a plurality of propagation modes resonating in the optical resonator.

5 Claims, 5 Drawing Sheets

(51) Int. Cl.
*H04B 10/2581* (2013.01)
*H01S 3/106* (2006.01)
*H01S 3/10* (2006.01)

(52) U.S. Cl.
CPC ............ *H01S 3/06754* (2013.01); *H01S 3/10* (2013.01); *H01S 3/106* (2013.01); *H04B 10/2581* (2013.01)

(56) References Cited

U.S. PATENT DOCUMENTS

| | | | | |
|---|---|---|---|---|
| 6,307,667 | B1 * | 10/2001 | Liang | .................. H01S 3/1302 359/337 |
| 2009/0046353 | A1 | 2/2009 | Seo et al. | |
| 2012/0262780 | A1 | 10/2012 | Bai et al. | |

FOREIGN PATENT DOCUMENTS

| | | | | |
|---|---|---|---|---|
| CN | 1265475 | A | | 9/2000 |
| CN | 1339188 | A | | 3/2002 |
| CN | 1406016 | A | | 3/2003 |
| EP | 0805571 | A2 | | 11/1997 |
| GB | 2303222 | A | * | 6/1997 ........... H01S 3/1302 |
| JP | H09-509012 | A | | 9/1997 |
| JP | H11238931 | A | | 8/1999 |
| JP | 2000294860 | A | | 10/2000 |
| JP | 2009-010080 | A | | 1/2009 |
| JP | 2009-503894 | A | | 1/2009 |
| JP | 2015530744 | A | | 10/2015 |
| JP | 2016111198 | A | | 6/2016 |
| KR | 20080052237 | A | * | 6/2008 ......... H01S 3/06754 |
| WO | WO-95/22847 | A1 | | 8/1995 |
| WO | WO9522847 | | * | 8/1995 ........... H01S 3/1302 |
| WO | WO-2005013445 | A1 | | 2/2005 |
| WO | WO-2007/019035 | A2 | | 2/2007 |

OTHER PUBLICATIONS

Y. Jung et al. "Few-mode EDFA Supporting 5 Spatial Modes with Reconfigurable Differential Modal Gain Control" ECOC2011 paper We.4.A.2.

Sudo, "Erbium doped fiber amplifier", Part 2, Chapter 2, Section 1, Optronics, 2002.

Y. Fukada et al., Optical Amplified Transmission of Uncompressed Digital Video Signal (SD-SDI/HD-SDI) with Gain-Clamped Optical Fiber Amplifier, IEICE Technical Report, CS2007-44, 2007.

K. Shibahara et al. "Dense SDM (12-CoreX3-Mode) Transmission Over 527 km With 33.2-ns Mode-Dispersion Employing Low-Complexity Parallel MIMO Frequency-Domain Equalization," J. Light w. Technol., vol. 34, No. 1 (2016).

Mahdi, M.A. et al., Characterization of lasing-oscillation direction in optical gain-clamped erbium-doped fiber amplifiers, Optics & Laser Technology, Jul. 3, 2006, No. 39, pp. 1020 to 1024.

Gryspolakis, N. et al., All-Optical Gain-Clamping in fibre optical parametric amplifiers, 2009 Conference on Lasers and Electro-Optics and 2009 Conference on Quantum electronics and Laser Science Conference, 2009, pp. 1 and 2.

International Search Report (English and Japanese) issued in International Application No. PCT/JP2017/038506, dated Dec. 26, 2017; ISA/JP.

Extended European Search Report from counterpart 178684676, dated May 13, 2020.

Chinese Office Action from counterpart 2017800661858, dated May 29, 2020.

Japanese Office Action from counterpart JP2018548957, dated Dec. 24, 2019.

* cited by examiner

OPTICAL AMPLIFIER

CROSS REFERENCE TO RELATED APPLICATIONS

This application is a 371 U.S. National Stage of International Application No. PCT/JP2017/038506, filed on Oct. 25, 2017, which claims priority to Japanese Application No. 2016-214532, filed on Nov. 1, 2016. The entire disclosures of the above applications are incorporated herein by reference.

TECHNICAL FIELD

The present disclosure relates to an optical amplifier in mode multiplexed transmission.

BACKGROUND ART

In recent years, internet traffic is still increasing due to the diversity of services, and transmission capacity has been dramatically increased due to an increase in the transmission speed and an increase in the number of multiplexed wavelengths by a wavelength division multiplexing (WDM) technique. Further, in recent years, the transmission capacity is expected to be further expanded by a digital coherent technique which has been extensively studied. In a digital coherent transmission system, frequency utilization efficiency has been improved by using multilevel phase modulation signals, but a higher signal-to-noise ratio is required. However, in a transmission system using a single mode fiber (SMF) in the related art, the transmission capacity is expected to be saturated with 100 Tbit/sec as the boundary due to input power limit caused by nonlinear effect in addition to theoretical limit, and it becomes difficult to further increase the capacity.

In order to further increase the transmission capacity in the future, a medium realizing innovative transmission capacity expansion is needed. Thus, mode multiplexed transmission using multi-mode fiber (MMF) that uses a plurality of propagation modes in an optical fiber as channels and can be expected to improve a signal-to-noise ratio and space utilization efficiency attracts attention. A higher-order mode propagating through the fiber has been the cause of signal deterioration, but the active utilization thereof is considered in the development of digital signal processing and multiplexing/demultiplexing techniques.

Further, consideration has been made in order to increase the distance of mode multiplexed transmission, and the amplification of an LP01 mode which is a fundamental mode and an LP02 mode which is a fourth-order LP mode using an Er3+ doped optical amplifier is reported.

In order to increase the distance of mode multiplexed transmission, it is necessary to reduce a gain difference between propagation modes (Differential Modal Gain, DMG) in an optical amplifier in order to maintain transmission quality of all modes. However, since light propagating in an Er-doped fiber (EDF) has different electric field distribution for each mode, generally different gains are obtained.

The gain of each mode is determined by overlapping the distribution of the excitation element number determined by the electric field distribution of excitation light incident on the amplification fiber and the rare-earth element doping distribution, and the electric field distribution of the signal light. In the optical amplifier in the related art that amplifies only the LP01 mode which is the fundamental mode, a rare-earth element doped region of the amplification fiber has a step index type structure in which rare-earth elements are doped to the entire core, a center-doped type structure in which rare-earth elements are doped only to the center part of the core, and the like as main structures. However, in the amplification fiber for multi-mode transmission which needs to take the gain of the higher-order mode into consideration, a structure in which a rare-earth element doping distribution is larger in the edge of the fiber core has also been proposed.

Further, in order to dynamically control the gain difference between modes, a method using a higher-order mode as a propagation mode of excitation light incident on the amplification fiber has been proposed. As a method of converting the mode of the excitation light from the fundamental mode to the higher-order mode, a method of axially shifting and exciting excitation light when the excitation light is incident on the optical amplification fiber (for example, NPL 1), and a method of adjusting the gain of each propagation mode by converting the mode of the excitation light to any mode by using a phase filter and entering the light into the optical amplification fiber (for example, NPL 2) have been proposed.

CITATION LIST

Non-Patent Literature

[NPL 1] Y. Yung et al. "First demonstration of multimode amplifier for spatial division multiplexed transmission systems" ECOC 2011 paper Th. 13. K. 4.
[NPL 2] Y. Jung et al. "Few-mode EDFA Supporting 5 Spatial Modes with Reconfigurable Differential Modal Gain Control" ECOC 2011 paper We. 4. A. 2.
[NPL 3] "Erbium doped optical fiber amplifier" written by Sudo, Part 2, Section 2, Chapter 1, Optronics, Inc.
[NPL 4] Suzuki et al., "Examination on a method for enlarging transmission distance of PON system based on optical amplifier: 1.3 μm burst mode optical amplifier based on gain-clamped PDFA", IEICE Tech. Rep., Vol. 104, no. 721, CS 2004-252, 2005.
[NPL 5] K. Shibahara et al. "Dense SDM (12-Core×3-Mode) Transmission Over 527 km with 33.2-ns Mode-Dispersion Employing Low-Complexity Parallel MIMO Frequency-Domain Equalization", J. Ligh tw. Technol., vol. 34, no. 1 (2016).

SUMMARY OF INVENTION

Technical Problem

An object of the present invention is to obviate the need for finely controlling the mode ratio of incident excitation light when dynamically controlling the gain difference between modes.

Solution to Problem

An optical amplifier according to the present disclosure includes an optical resonator which includes an amplification fiber that is capable of amplifying signal light having one or more propagation modes and resonates at least one propagation mode that is included in the signal light amplified by the amplification fiber; an excitation light source which outputs excitation light for exciting the amplification fiber; and a multiplexer which multiplexes the signal light and the excitation light, in which the optical resonator includes a gain clamp setting unit which sets gain clamp for at least one propagation mode among a plurality of propagation modes resonating in the optical resonator.

The gain clamp setting unit may include a mode selector that selectively propagates the propagation mode for setting the gain clamp from among the propagation modes resonating in the optical resonator; and an optical attenuator that attenuates a light intensity of the propagation mode selected by the mode selector.

Here, the mode selector may be a single mode fiber.

The gain clamp setting unit may include a mode demultiplexer that separates the propagation mode resonating in the optical resonator for each mode; an optical attenuator that is capable of adjusting a light intensity of each port after mode-demultiplexing by the mode demultiplexer; and a mode multiplexer that multiplexes light passing through the optical attenuator.

In the present disclosure, the optical resonator may include a light source that generates light having a wavelength different from a wavelength of the signal light; and an optical coupler that couples light from the light source, to the optical resonator.

Here, in the present disclosure, the gain clamp setting unit may include a mode converter that converts the light from the light source, into the propagation mode for setting the gain clamp, and the mode converter may be provided between the light source and the optical coupler.

In the present disclosure, the optical resonator may further include a plurality of light sources that generate light having a wavelength different from the wavelength of the signal light; and an optical coupler that couples light from the plurality of light sources, to the optical resonator, and the gain clamp setting unit may include a mode converter that is inserted between at least one of the plurality of light sources and the optical coupler and converts light from the plurality of light sources, into a propagation mode for setting gain clamp; and an optical attenuator that is inserted in the optical resonator and attenuates a light intensity of at least one propagation mode converted by the mode converter.

The optical resonator may be a ring resonator in which each of the propagation modes included in the signal light is capable of circulating on an optical propagation path.

In addition, the above disclosures can be combined as much as possible.

Advantageous Effects of Invention

According to the present disclosure, it is possible to realize control of the gain difference between modes in the multi-mode optical amplifier without fine control of the mode ratio of the incident excitation light.

DESCRIPTION OF EMBODIMENTS

Hereinafter, embodiments of the present disclosure will be described in detail with reference to the accompanying drawings. The present disclosure is not limited to the embodiments described below. The embodiments are only examples, and the present disclosure can be implemented in various modified and improved forms based on knowledge of those skilled in the art. The same reference numerals in the present specification and drawings denote the same constituent elements.

In the present disclosure, a method using a gain clamp is described as a new method, in order to control the gain difference between modes. In this method, the amplification fiber 11 is installed in the optical resonator, and laser of any wavelength is oscillated. At a desired resonance wavelength, the gain becomes equal to the loss in the optical resonator, irrespective of the excitation intensity when the laser threshold is reached. At this time, the inverted distribution state of the amplification fiber 11 is locked, and since the gain becomes constant, this phenomenon is called gain clamp. This is caused by increasing the inverted distribution due to the increase in the excitation intensity in the amplifier and by reducing the inverted distribution until the gain becomes equal to the loss due to stimulated emission of the resonant light. As examples of the configuration of the clamp type optical amplifier in the single mode, there are reports of NPL 3, NPL 4, and the like.

The gain clamp in the optical amplifier is a self-excited type using spontaneous emission light generated from the amplification fiber 11 as shown in NPL 3, or an external supply type of supplying light from an external light source as shown in NPL 4 is known. In these methods, an optical coupler that multiplexes and demultiplexes light of any wavelength region, an optical attenuator that changes the oscillation threshold, and the like are required, in addition to an optical coupler that multiplexes excitation light and signal light.

All of the studies so far have been made in a single mode fiber, the wavelength to be resonated is one wavelength, and the resonance mode is only the LP01 mode which is the fundamental mode. However, in the multi-mode optical amplifier, not only the LP01 mode but also the higher-order mode are propagated and amplified. Therefore, even if the inverted distribution state is locked due to the resonance mode in the optical amplifier, the magnitude of the overlap with the locked inverted distribution state is different in the mode other than the resonance mode, so that it is expected that the manner of clamping is different. Therefore, in the present disclosure, the gain for each mode and the gain difference between modes are controlled by arbitrarily setting the mode to be gain-clamped.

Figure 1:
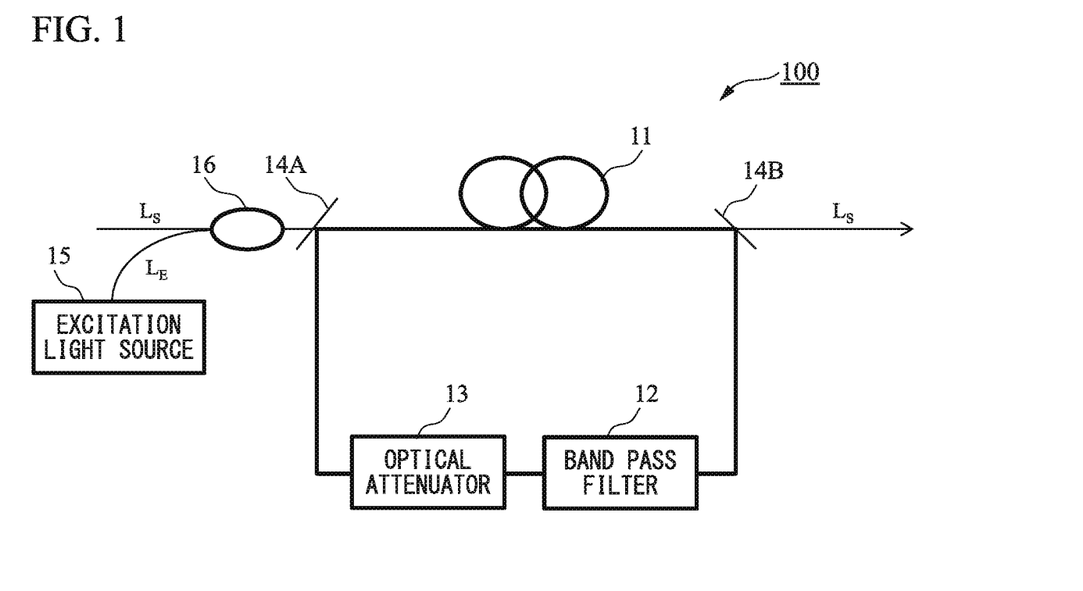
FIG. 1 is a schematic diagram of a multi-mode optical amplifier having a ring resonator according to the disclosure.

FIG. 1 is a schematic diagram of an aspect of an optical amplifier 100 according to the disclosure. FIG. 1 is a multi-mode optical amplifier 100 including an optical resonator that generates a clamped gain. The optical resonator includes an amplification fiber 11, a band pass filter 12, an optical attenuator 13 that adjusts the oscillation threshold of the optical resonator, and optical couplers 14A, 14B that resonate the clamped light. The amplification fiber 11 is excited by the excitation light generated by the excitation light source 15. The band of the signal light is, for example, a C band of 1530 to 1565 nm or an L band of 1565 to 1620 nm. When the amplification fiber 11 is a fiber doped with erbium, the excitation light is preferably in the 980 nm band or the 1480 nm band. The optical coupler 16 functions as a multiplexer that multiplexes the signal light LS and the excitation light LE.

In the present embodiment, a ring resonator is used as the optical resonator, and a self-excited type is used in which a part of the spontaneous emission light emitted from the amplification fiber 11 is extracted and resonated by using the optical couplers 14A, 14B located before and after the amplification fiber 11. As the optical resonator, other than the ring resonator, for example, an optical resonator of a fiber grating type or the like can be formed in the optical amplifier. As the band of the spontaneous emission light to be extracted, it is desirable to use bands other than the bands used as the signal light LS, in order not to affect the signal light LS.

In the configuration of FIG. 1, since one or more modes can oscillate, the propagation mode of the clamped light cannot be controlled. Thus, in the optical amplifier according to the present embodiment, a gain clamp setting unit that controls the propagation mode of the clamp light is provided in the ring resonator. The gain clamp setting unit has a function of setting gain clamp for at least one propagation mode resonating in the optical resonator.

First Embodiment

Figure 2:
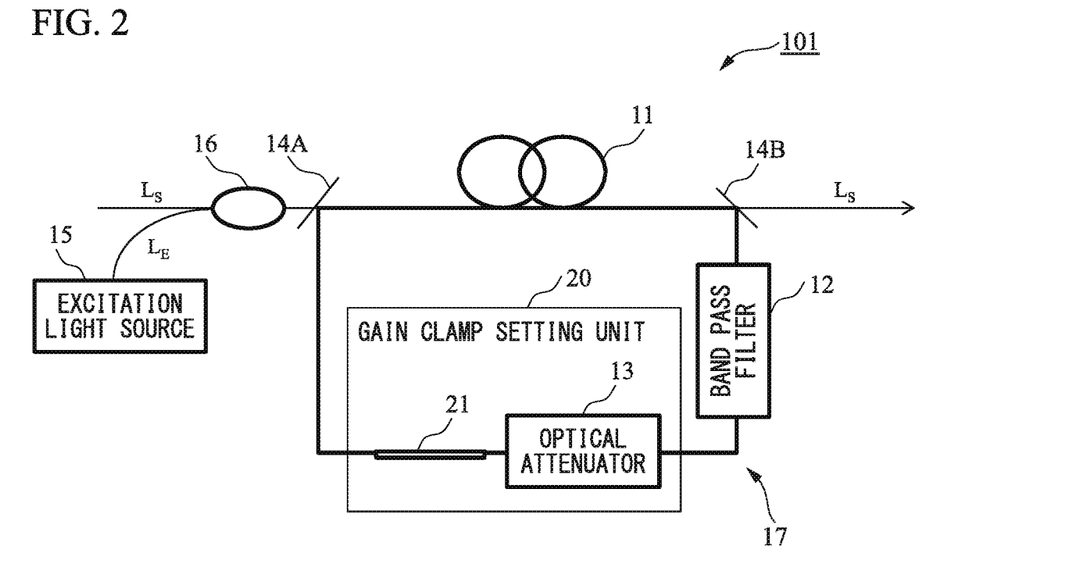
FIG. 2 is a schematic diagram of an optical amplifier according to a first embodiment having a single mode fiber in an optical resonator.

FIG. 2 shows a configuration example in which an LP01 mode is clamped in the optical resonator. An optical amplifier 101 according to the present embodiment includes an optical resonator 17 having a gain clamp setting unit 20, an excitation light source 15, and an optical coupler 16. The gain clamp setting unit 20 according to the present embodiment sets gain clamp, for at least one propagation mode resonating in the optical resonator 17. The gain clamp setting unit 20 includes a higher-order mode filter 21 and an optical attenuator 13. The higher-order mode filter 21 cuts off the spontaneous emission light of the higher-order mode. As the higher-order mode filter 21, for example, an optical component propagating only a single mode, such as a single mode fiber or a single mode device, or an optical isolator can be exemplified.

In the present embodiment, since spontaneous emission light of the higher-order mode is cut off by the higher-order mode filter 21, only the LP01 mode resonates. That is, although the gain of the LP01 mode to be gain-clamped is constant, since the higher-order mode has a different clamping quantity, it becomes possible to control the gain with respect to a mode other than the resonance mode, by adjusting the excitation intensity or the optical attenuator 13 in the optical resonator. The width of the gain control for the propagation mode other than the resonance mode varies depending on the inverted distribution state in the amplification fiber 11.

An example in which the operation is checked experimentally by using the system of FIG. 2 capable of propagating two LP modes will be described. Here, as the amplification fiber 11, an EDF in which erbium is doped in a core in a step shape is used. The excitation light LE has a wavelength 1480 nm in the LP01 mode, a wavelength of light resonated in the ring is 1570 nm, and the wavelength of the amplified signal light LS is 1530 nm.

Figure 3:
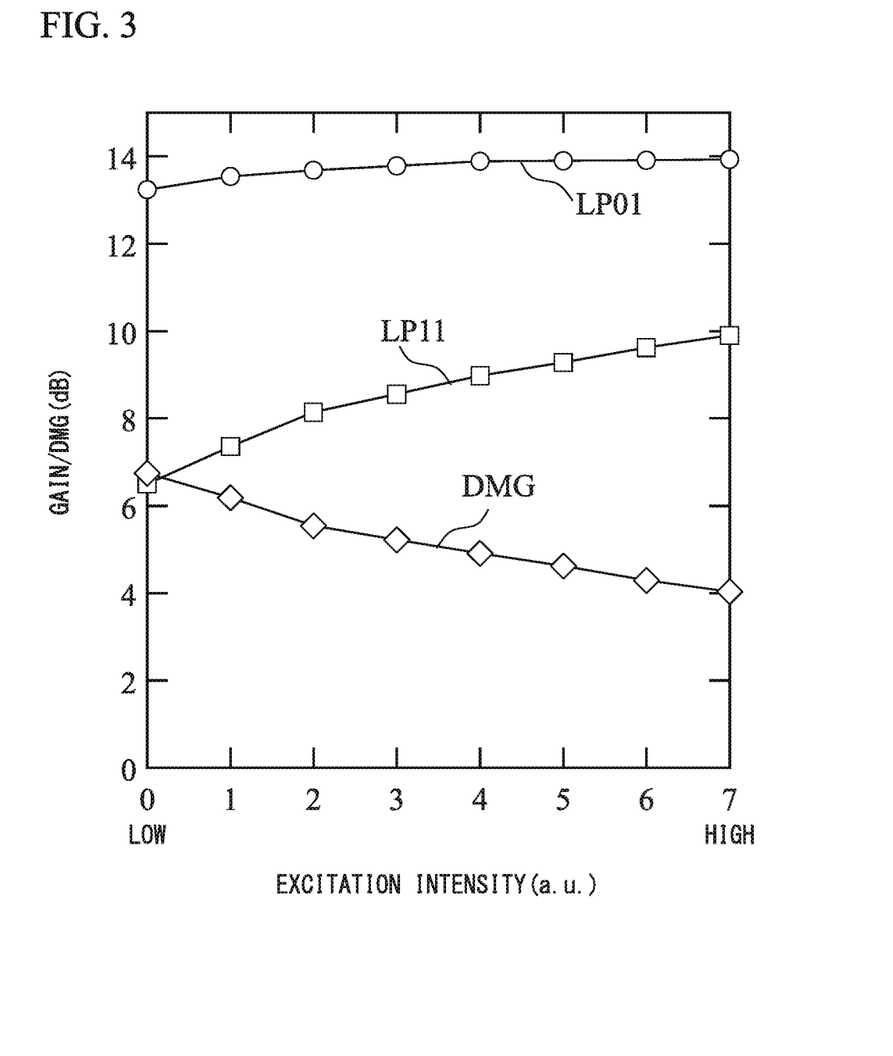
FIG. 3 is an example of a relationship between an excitation intensity and gain and DMG.

FIG. 3 shows the relationship between the gain and DMG and the excitation intensity of the LP01 mode and the LP11 mode. From the results, it can be checked that the gain of the LP01 mode is almost constant with respect to the excitation intensity, whereas the gain of the LP11 mode is increased by about 3.5 dB. From this, when the LP01 mode is resonated in the ring resonator, the gain spectrum of the LP01 mode is clamped, but in the LP11 mode, the degree of clamping is weaker as compared with the LP01 mode and the gain value can be controlled depending on the excitation intensity.

Second Embodiment

Figure 4:
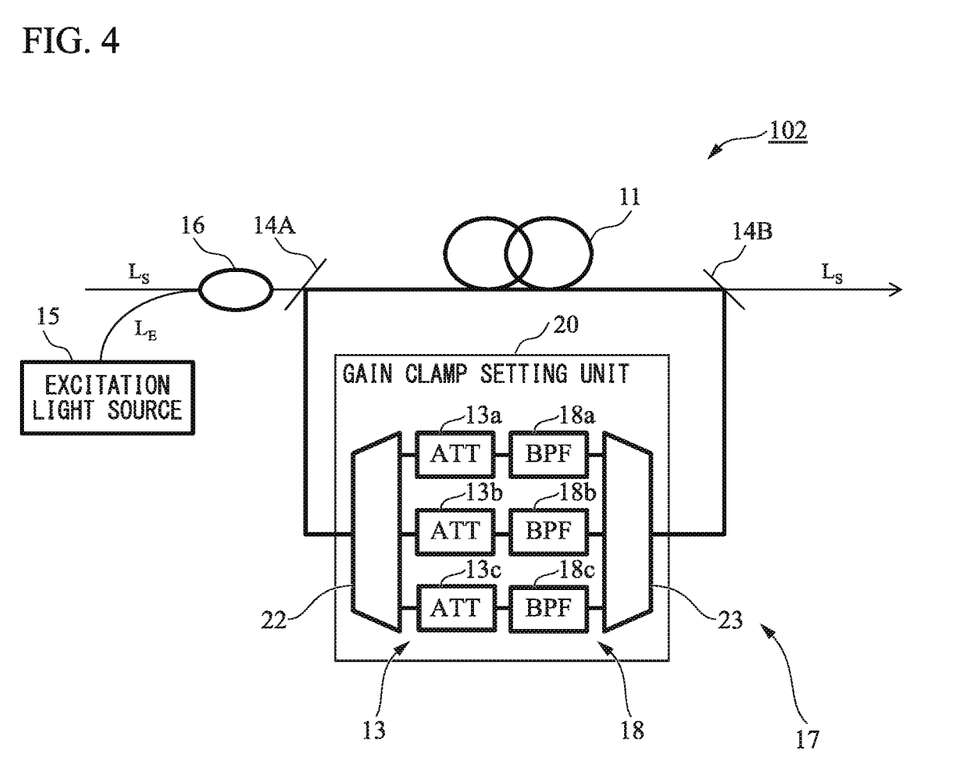
FIG. 4 is a schematic diagram of an optical amplifier according to a second embodiment having a mode multiplexer/demultiplexer and an optical attenuator in an optical resonator.

In the first embodiment, an embodiment in which the LP01 mode is clamped is shown, but in an optical amplifier 102 of a second embodiment, an example in which the gain clamp setting unit 20 clamps not only the fundamental mode but also the higher-order mode is shown. FIG. 4 shows a system for controlling the loss in the optical resonator 17 for each propagation mode. In the optical resonator, a mode demultiplexer 22, an optical attenuators 13 in each port after demultiplexing, and a mode multiplexer 23 are included.

The mode demultiplexer 22 separates the propagation mode resonating in the optical resonator to respective modes. Specifically, the mode demultiplexer 22 separates the incident light into an LP01 mode, an LP11a mode, and an LP11b mode. With respect to the LP01 mode, the LP11a mode, and the LP11b mode after mode-demultiplexing by the mode demultiplexer 22, the optical attenuator 13 includes an optical attenuator 13a that adjusts the light intensity of the LP01 mode, an optical attenuator 13b that adjusts the light intensity of the LP11a mode, and an optical attenuator 13c that adjusts the light intensity of the LP11b mode. Further, the light passing through the optical attenuator 13a passes through the band pass filter 18a and is incident on the mode multiplexer 23. The light passing through the optical attenuator 13b passes through the band pass filter 18b and is incident on the mode multiplexer 23. The light passing through the optical attenuator 13c passes through the band pass filter 18c and is incident on the mode multiplexer 23. The mode multiplexer 23 multiplexes the lights passing through the band pass filters 18a, 18b, and 18c. As described above, in the present embodiment, loss is given to a propagation mode to be attenuated after mode demultiplexing, whereby the loss in the optical resonator can be adjusted for each mode.

In the present embodiment, the optical resonator 17 is described using a ring resonator through which light propagates counterclockwise, but a ring resonator through which light propagates clockwise may be used. In this case, the arrangement of the mode demultiplexer 22 and the mode multiplexer 23 is reversed, and the light enters the gain clamp setting unit 20 from the optical coupler 14B.

Third Embodiment

Figure 5:
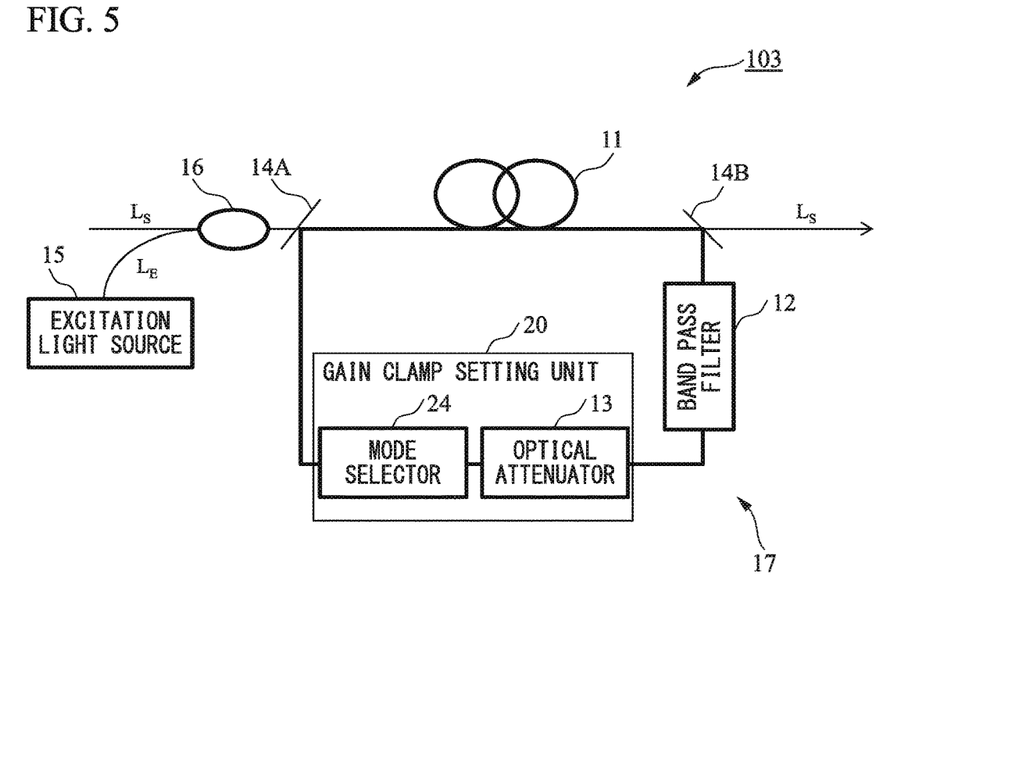
FIG. 5 is a schematic diagram of an optical amplifier according to a third embodiment having a mode selector in an optical resonator.

In an optical amplifier 103 of a third embodiment, as shown in FIG. 5, a mode selector 24 capable of selectively propagating only a specific mode is inserted in the optical resonator 17. With this configuration, a specific mode can be clamped. Such a mode selector 24 is realized, for example, by using a spatial optical element as used in NPL 5.

For example, by resonating the LP11 mode in the optical amplifier with two LP modes, it becomes possible to adjust the gain difference between modes as in the case where the LP01 mode is gain-clamped in FIG. 3.

Fourth Embodiment

Figure 6:
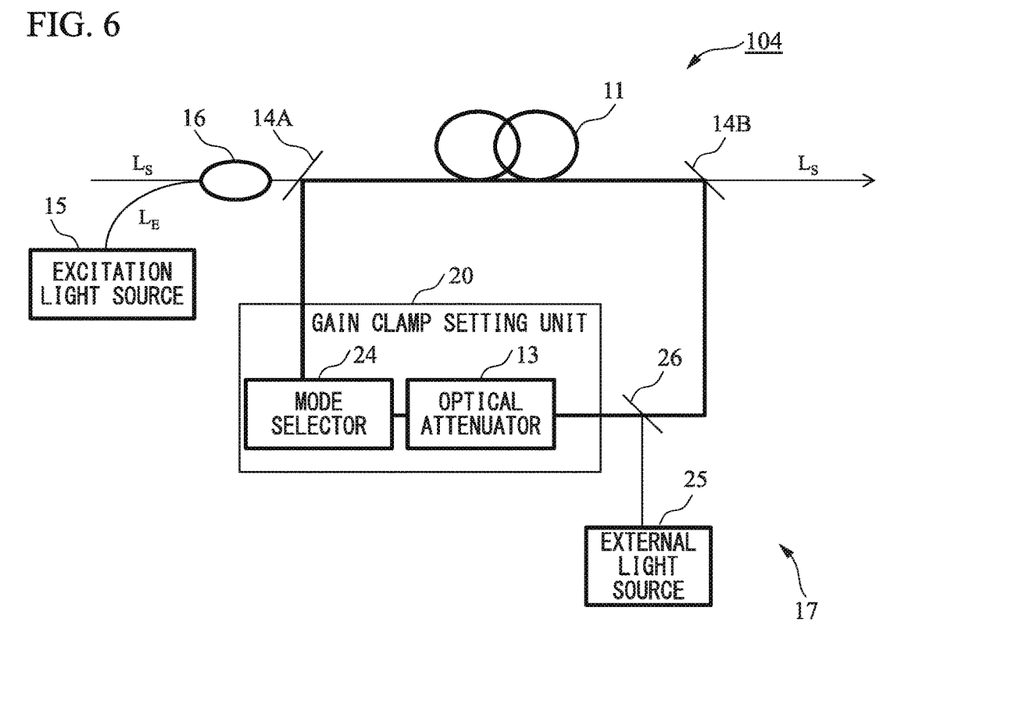
FIG. 6 is a schematic diagram of an optical amplifier according to a fourth embodiment having a ring resonator using an external light source.

In the first to third embodiments described above, the optical resonator using an external light source (light source) may be used instead of the self-excited type in which the spontaneous emission light generated in the amplification fiber 11 is resonated. FIG. 6 shows an optical amplifier 104 of the fourth embodiment. A specific mode can be clamped by coupling the light generated from the external light source (light source) 25 into the optical resonator 17.

The external light source 25 generates light of a wavelength different from the wavelength of the signal light LS. In order for the optical couplers 14A, 14B to couple light not in the signal light wavelength band into the resonator, the external light source 25 has preferably a wavelength range different from the wavelength band of the signal light. Further, the propagation modes resonating in the optical resonator can be realized by installing any gain clamp setting unit 20 in the first to third embodiments. Although not shown in FIG. 6, the band pass filter 12 may be disposed in the optical resonator 17 also in the present embodiment.

Fifth Embodiment

Figure 7:
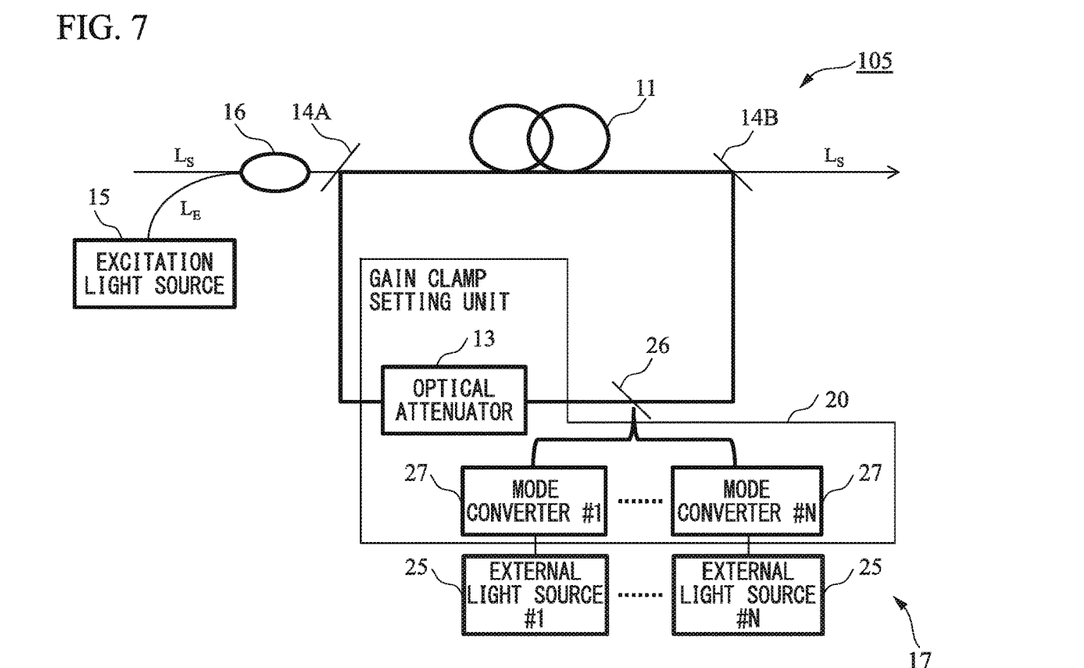
FIG. 7 is a schematic diagram of an optical amplifier according to a fifth embodiment having a ring resonator using an external light source and a mode converter.

In an optical amplifier 105 of a fifth embodiment, as shown in FIG. 7, a mode converter 27 is installed after the external light source 25, in order to resonate any mode, in the case of the optical resonator using the external light source 25. That is, the gain clamp setting unit 20 disposed in the optical resonator 17 according to the present embodiment includes the mode converter 27 and an optical attenuator 13. The mode converter 27 converts light that is output from the external light source 25 into a set propagation mode. This makes it possible to control the gain value of the desired mode. It is preferable that the mode converter 27 is inserted in the optical path between the external light source 25 and the optical coupler 26.

In order to resonate a plurality of n (n is a positive number equal to or greater than 2) propagation modes in the resonator, a plurality of external light sources 25 #n and mode converters 27 #n need to be provided. In this case, the optical attenuator 13 attenuates the light intensity of at least one light which is mode-converted by the mode converter 27 and coupled into the optical resonator.

However, the number of propagation modes that the optical attenuator 13 attenuates is not limited to one. For example, the gain differences between a plurality of modes may be controlled by setting the attenuation characteristic of the optical attenuator 13. Although not shown in FIG. 7, the band pass filter 12 may be disposed in the optical resonator also in the present embodiment.

Figure 8:
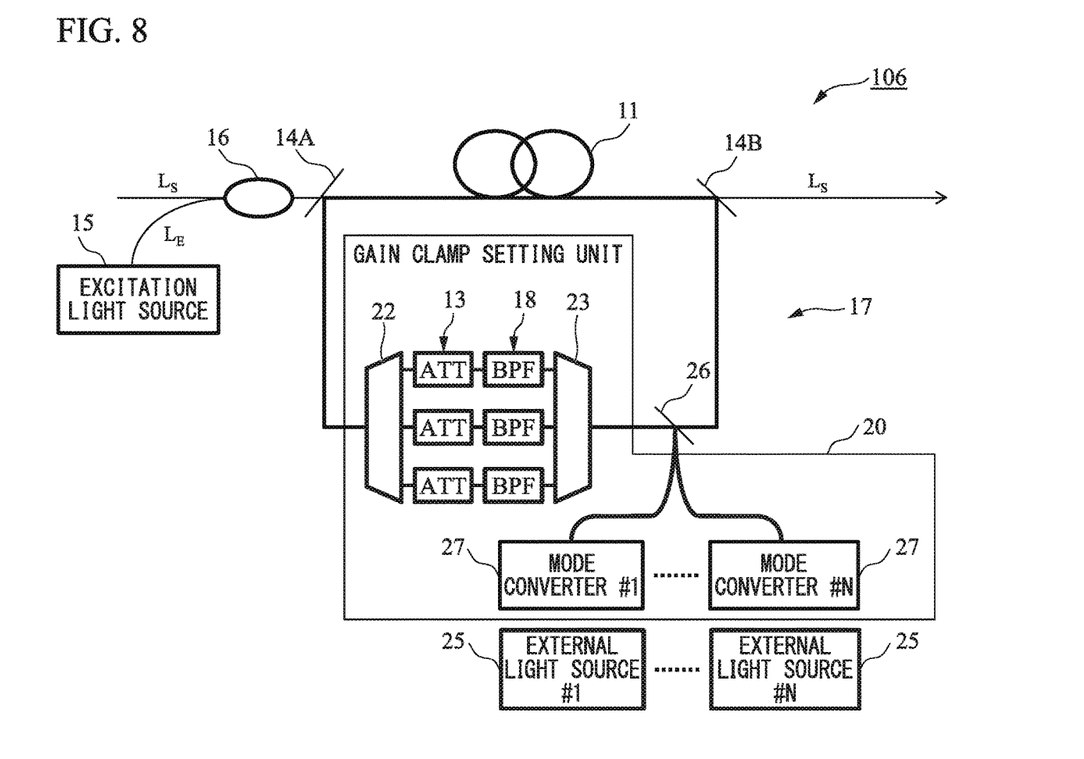
FIG. 8 is a schematic diagram showing another embodiment of the optical amplifier according to the fifth embodiment.

In the optical amplifier 106 of the present embodiment, as shown in FIG. 8, the gain clamp setting unit 20 of the optical resonator 17 also may have a configuration including the mode demultiplexer 22 that controls loss in the optical resonator 17 for each propagation mode, the optical attenuator 13, and the mode multiplexer 23, as described in the second embodiment. In this case, the propagation mode separated by the mode demultiplexer 22 includes the propagation mode that is mode-converted by the mode converter 27.

Although preferred embodiments of the present invention have been described above, the present invention is not limited to these embodiments and modification examples thereof. Additions, omissions, substitutions, and other changes in the structure are possible without departing from the spirit of the present invention.

The present invention is not limited by the foregoing description, but only by the scope of the appended claims.

INDUSTRIAL APPLICABILITY

According to the optical amplifier according to the present disclosure, gain adjustment for each propagation mode and prolongation of the transmission distance can be realized in transmission using a plurality of modes.

REFERENCE SIGNS LIST

11: AMPLIFICATION FIBER
12: BAND PASS FILTER
13: OPTICAL ATTENUATOR
14A, 14B, 16, 26: OPTICAL COUPLER
15: EXCITATION LIGHT SOURCE
17: OPTICAL RESONATOR
20: GAIN CLAMP SETTING UNIT
21: HIGHER-ORDER MODE FILTER
22: MODE DEMULTIPLEXER
23: MODE MULTIPLEXER
24: MODE SELECTOR
25: EXTERNAL LIGHT SOURCE (LIGHT SOURCE)
27: MODE CONVERTER
101, 102, 103, 104, 105, 106: OPTICAL AMPLIFIER

The invention claimed is:

1. An optical amplifier comprising:
an optical resonator which includes an amplification fiber that is capable of amplifying signal light having one or more propagation modes and resonates at least one propagation mode that is included in the signal light amplified by the amplification fiber;
an excitation light source which outputs excitation light for exciting the amplification fiber; and
a multiplexer which multiplexes the signal light and the excitation light,
wherein the optical resonator includes a gain clamp setting unit which sets gain clamp for at least one propagation mode among a plurality of propagation modes resonating in the optical resonator,
wherein the gain clamp setting unit includes
a mode selector that selectively propagates the propagation mode for setting the gain clamp from among the plurality of propagation modes resonating in the optical resonator, and
an optical attenuator that attenuates a light intensity of the propagation mode selected by the mode selector.

2. The optical amplifier according to claim 1,
wherein the mode selector is a single mode fiber.

3. An optical amplifier comprising:
an optical resonator which includes an amplification fiber that is capable of amplifying signal light having one or more propagation modes and resonates at least one propagation mode that is included in the signal light amplified by the amplification fiber;
an excitation light source which outputs excitation light for exciting the amplification fiber; and
a multiplexer which multiplexes the signal light and the excitation light,
wherein the optical resonator includes a gain clamp setting unit which sets gain clamp for at least one propagation mode among a plurality of propagation modes resonating in the optical resonator, wherein the gain clamp setting unit includes
a mode demultiplexer that separates the propagation mode resonating in the optical resonator to respective modes,
an optical attenuator that is capable of adjusting a light intensity of each port after mode-demultiplexing by the mode demultiplexer, and
a mode multiplexer that multiplexes light passing through the optical attenuator.

4. An optical amplifier comprising:
an optical resonator which includes an amplification fiber that is capable of amplifying signal light having one or more propagation modes and resonates at least one propagation mode that is included in the signal light amplified by the amplification fiber;
an excitation light source which outputs excitation light for exciting the amplification fiber; and
a multiplexer which multiplexes the signal light and the excitation light,
wherein the optical resonator includes a gain clamp setting unit which sets gain clamp for at least one propagation mode among a plurality of propagation modes resonating in the optical resonator,
wherein the optical resonator includes
a light source that generates light having a wavelength different from a wavelength of the signal light, and
an optical coupler that couples the light from the light source, to the optical resonator,
wherein the gain clamp setting unit includes a mode converter that converts the light from the light source, into the propagation mode for setting the gain clamp, and
wherein the mode converter is provided between the light source and the optical coupler.

5. An optical amplifier comprising:
an optical resonator which includes an amplification fiber that is capable of amplifying signal light having one or more propagation modes and resonates at least one propagation mode that is included in the signal light amplified by the amplification fiber;
an excitation light source which outputs excitation light for exciting the amplification fiber; and
a multiplexer which multiplexes the signal light and the excitation light,
wherein the optical resonator includes a gain clamp setting unit which sets gain clamp for at least one propagation mode among a plurality of propagation modes resonating in the optical resonator,
wherein the optical resonator further includes
a plurality of light sources that generate light having a wavelength different from a wavelength of the signal light, and
an optical coupler that couples the light from the plurality of light sources, to the optical resonator, and
wherein the gain clamp setting unit includes
a mode converter that is inserted between at least one of the plurality of light sources and the optical coupler and converts the light from the plurality of light sources, into a propagation mode for setting gain clamp, and
an optical attenuator that is inserted in the optical resonator and attenuates a light intensity of at least one propagation mode converted by the mode converter.

* * * * *